United States Patent [19]
Monks

[11] 3,753,389
[45] Aug. 21, 1973

[54] BATTERY CONTACT WIPER FOR CAMERAS

[75] Inventor: David E. Monks, Rochester, N.Y.

[73] Assignee: Eastman Kodak Company, Rochester, N.Y.

[22] Filed: Mar. 2, 1972

[21] Appl. No.: 231,175

[52] U.S. Cl. .................................. 95/11, 95/31
[51] Int. Cl. ............................................ G03b 19/02
[58] Field of Search .................. 95/11, 31; 136/173

[56] References Cited
UNITED STATES PATENTS
3,537,909   11/1970   Horton .............................. 136/173
1,160,519   11/1915   Lyhne .............................. 240/10.65

Primary Examiner—John M. Horan
Attorney—W. H. J. Kline et al.

[57] ABSTRACT

A camera housing defines a cavity for receiving a battery, and a door is movable between open and closed positions to provide access to the cavity. A pair of electrical contacts engage the battery, and a projection on the door moves a received battery relative to the contacts in response to movement of the door between its open and closed positions so as to provide rubbing engagement between the contacts and the battery.

7 Claims, 2 Drawing Figures

PATENTED AUG 21 1973

3,753,389

BATTERY CONTACT WIPER FOR CAMERAS

CROSS-REFERENCE TO RELATED APPLICATIONS

Reference is made to commonly assigned, copending U.S. Pat. applications Ser. No. 076,836, filed Sept. 30, 1970 in the names of Jeffrey R. Stoneham et. al., entitled "Battery Holder" and Ser. No. 167,324, filed July 29, 1971 in the names of Paul J. Ernisse et al., entitled "Battery Receiving Mechanism for Camera."

BACKGROUND OF THE INVENTION

1. Field of the Invention

This invention relates to battery receiving mechanisms, and more specifically to a device for cleaning the contacts of a battery of leads in the mechanism.

2. Description of the Prior Art

The problems associated with corrosion of battery contacts in cameras are well known. It is common for camera manufacturers to suggest to camera users that both batteries and battery contacts be cleaned with abrasive material to improve electrical contact.

A more sophisticated approach to this problem is to protect the camera from corrosion by encasing batteries in noncorrosive battery holders. Recently, a plastic battery holder has been developed which protects a set of three batteries. It is shaped to fit into a small space in a camera. A holder of this type is disclosed in U.S. Pat. application Ser. No. 76,863, filed Sept. 30, 1970 in the names of J. R. Stoneham et al., entitled "Battery Holder." Another battery holder offering some protection against the camera is shown in U.S. Pat. No. 3,429,596, which issued Apr. 22, 1969 in the name of Peterson. The use of battery holders is only a partial solution to the problem because corrosion of contacts will also occur from sources other than the batteries themselves.

In U.S. Pat. No. 3,587,423, which issued June 28, 1971 to Simon, a battery compartment is disclosed adjacent either a flash unit socket or a film compartment in which the battery and its contacts are rubbed together in response to insertion of a flash unit in the socket or a magazine in the film compartment. This rubbing has the effect of cleaning the contacts and providing longer life for this portion of the apparatus. Unfortunately, it rarely has been convenient to place the batteries on a camera adjacent the flash socket, and the force of magazine insertion is not a convenient source of energy for operation of this type of mechanism, especially in a still camera.

In copending, coassigned U.S. Pat. application Ser. No. 167,324, filed July 29, 1971 in the names of Paul J. Ernisse et al., a camera mechanism is disclosed wherein relative movement between a received battery and at least one electrical contact is provided in response to the opening and closing of the film compartment cover of the camera. The battery compartment is built into the film compartment cover of the camera and the contacts are mounted on the main camera housing and are movable by a cam surface connected to a cover hinge. Although this arrangement provides excellent wiping action of the electrical contacts each time the camera cover is opened and closed, the apparatus in accordance with the present invention is quite a bit simpler in construction and less expensive to manufacture.

SUMMARY OF THE INVENTION

It is an object of the present invention to provide a camera with means to clean the contacts for a battery by moving the battery relative to the contacts in response to movement of the camera door between its open and closed positions.

In accordance with the above objects, a preferred embodiment of the present invention includes a camera having a housing which defines a battery receiving cavity and a door movable relative to the housing between open and closed positions to provide access to the cavity. A pair of contacts connected to an electrical circuit engage the battery in the cavity. A projection on the camera door engages the battery as the door is closed to move the battery relative to the contacts and against the force of a spring to provide rubbing engagement between the contacts and the battery to keep the contacts clean.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description will be directed in particular to the elements forming part of, or cooperating more directly with, apparatus in accordance with the present invention. It is to be understood that camera elements not specifically shown or described may take various forms well known to those skilled in the art.

Figure 1:
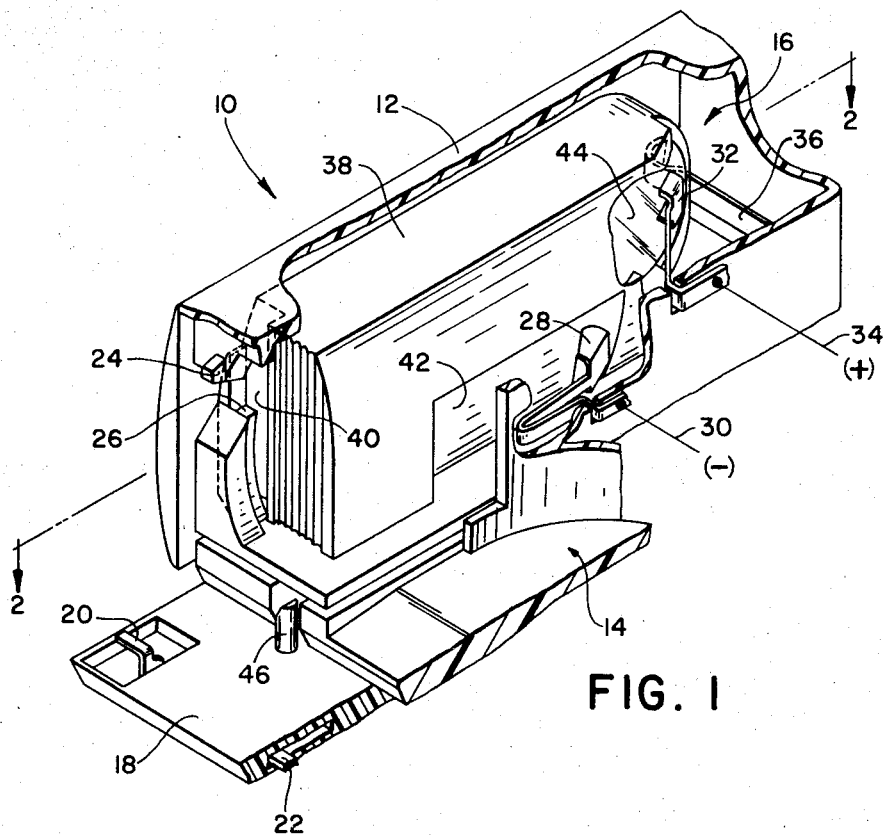
FIG. 1 is a perspective view of a portion of a camera embodying the present invention and showing a film compartment door in its open position with a battery in place.

Referring to FIG. 1, a camera 10 includes a housing 12 which defines a film compartment 14 and a battery compartment 16. The film and battery compartments are closed by a single cover or door 18 which is connected to housing 12 by a hinge, not shown. One of a pair of latch members (only one of which is shown and referred to by numeral 20) which are controlled by a single linkage 22 cooperates with a tab 24 to latch the door in its closed position.

Battery compartment 16 has an entrance aperture and a rib 26 extending into the cavity adjacent the aperture. An electrical contact 28 in the form of a leaf spring is connected to an electrical lead 30 and another contact 32 is connected to another lead 34. Leads 30 and 34 are connected to an electrical load in the camera such as an exposure control device. A leaf spring 36 is mounted in the base of the cavity. An electrical battery holder 38 which may be of the type disclosed in aforementioned U.S. Pat. application Ser. No. 76,836, is pushed into the cavity against leaf spring 36. Once in the cavity, holder 38 is moved laterally (upwardly as viewed in FIG. 2) until a groove 40 in the battery holder aligns with rib 26. When the holder is now released, spring 36 will move holder 38 rearwardly so that rib 26 enters groove 40 to lock the holder in place. Electrical contacts 28 and 32 now engage negative contact 42 and positive contact 44 of the battery holder, respectively.

To remove holder 38, the foregoing operation is reversed. That is, holder is moved against spring 36 until rib 26 is clear of slot 40. The holder is then moved downwardly as viewed in FIG. 2, and spring 36 moves a holder sufficiently out of the cavity for the operator to grasp the holder.

Figure 2:
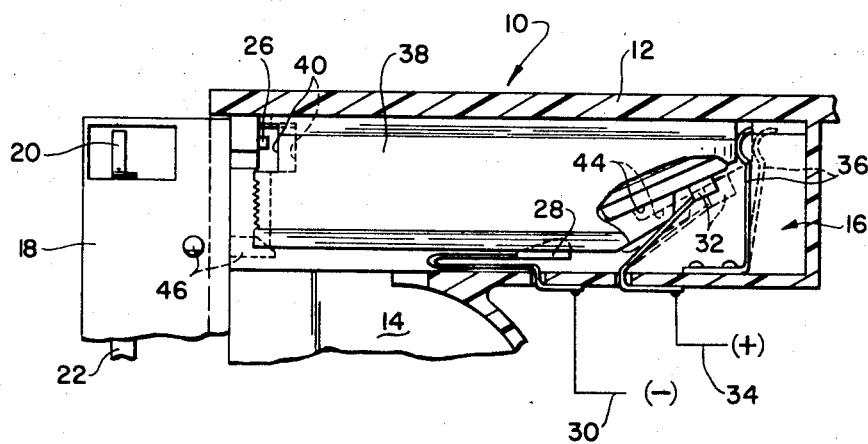
FIG. 2 is a sectional view of the camera portion shown in FIG. 1 taken along line 2—2 of FIG. 1 and showing the movement of the battery as the camera door is closed.

A pin or projection 46 has been provided on door 18 so as to engage battery holder 38 as the door is closed and to move the holder from its full line position in FIG. 2 to its phantom line position against the force of spring 36. Such movement causes relative movement between battery contacts 42 and 44 and camera leads 28 and 32, respectively, so as to provide rubbing engagement between the contacts and the leads, cleaning all four surfaces. This cleaning action may be aided by roughening the ends of contacts 28 and 32 if desired. The end of projection 46 has been tapered or bevelled to keep the battery holder pushed upwardly as viewed in FIG. 2 to prevent accidental ejection of the battery by downward movement as the camera door is opened.

Movement of the battery holder relative to the camera contacts each time the camera door is opened or closed provides for cleaning of the respective contacts upon changing a film roll or battery. If desired, the battery door may be separate from the film compartment door so that a battery may be replaced without risking film fogging. However, this would not produce a contact-cleaning movement of the battery when an exposed film roll is removed from the camera and when a fresh roll of film is substituted. Of course, one skilled in the art will readily see similar methods for moving the battery holder when the film compartment door is opened in cameras having separate battery and film doors.

The invention has been described in detail with particular reference to a preferred embodiment thereof, but it will be understood that variations and modifications can be effected within the spirit and scope of the invention.

I claim:

1. A camera comprising:
   a housing having means for defining (1) a first cavity for receiving a film roll and (2) a second cavity for receiving a battery;
   a door movable relative to said housing between open and closed positions to provide access to said first and second cavities;
   an electrical circuit;
   a pair of contacts on said housing and extending into said cavity for connecting said battery to said electrical circuit; and
   means for moving a received battery relative to said contacts in response to movement of said door between its open and closed positions so as to provide rubbing engagement between said contacts and a received battery each time said door is opened or closed.

2. A camera including a housing which defines a cavity for receiving a battery holder of the type having (1) an elongated configuration, (2) a first portion with an external electrical contact of one polarity thereat, (3) a second portion with an external contact of opposite polarity thereat and (4) an end portion with a groove therein; said camera comprising:
   a rib for entering the groove of a received battery holder;
   a set of resilient contacts on said housing and extending into said cavity for electrically engaging the battery holder contacts to put an electrical load across the batteries and for cooperating with said rib for supporting said battery holder in the camera;
   a door movable relative to said housing between open and closed positions to provide access to said cavity; and
   means on said door for moving said battery holder relative to said contacts in response to movement of said door from its open position to its closed position.

3. A camera for receiving an elongated battery holder having (1) a first end wall normal to the elongated dimension of the holder, (2) a second, tapered end wall opposite said first end wall, and (3) wall means defining a groove on the first end wall, said wall means forming an abutment surface parallel to said elongated dimension; said camera comprising
   wall means defining (1) a cavity having an elongated dimension greater than the elongated dimension of the battery holder and (2) an opening through said camera wall means through which a holder may be inserted into said cavity with the elongated dimension of the battery holder parallel to the elongated dimension of the cavity;
   a door movable between open and closed positions to provide access to said cavity; and
   means for moving a received battery holder in the direction of said elongated dimension of said cavity when said door is moved between its open and closed positions.

4. A camera as defined in claim 3 further comprising a rib on said camera wall means adjacent said opening and extending into said cavity for entering into the groove of a received battery holder, said rib having a surface facing away from said opening and toward the abutment surface of a received battery holder to block movement of the first end wall of the battery holder toward said opening.

5. In a camera having a housing which defines a first cavity for receiving at least one battery and a second cavity for receiving roll film, a door movable relative to said housing between open and closed positions to provide access to at least said second cavity, an electrical circuit, and a contact for engaging said battery to connect said battery to said circuit; the improvement comprising means for moving said battery relative to said contact in response to movement of said door between its open and closed positions so as to provide rubbing engagement between said contact and a received battery.

6. A camera comprising:
   a housing having means for defining (1) a cavity for receiving at least one battery (2) an opening through which such a battery may be inserted into said cavity, and (3) a door movable relative to said housing between open and closed positions to respectively uncover and cover said opening, said cavity being dimensioned to permit movement of a received battery in said cavity;

means on said housing for restricting such movement of a received battery between first and second positions when said door is in an open position;
an electrical circuit;
at least one electrical contact on said housing and extending into said cavity for connecting a received battery to said circuit; and
means for moving a received battery relative to said contact to its first and second positions respectively in response to movement of said door between its open and closed positions so as to provide rubbing engagement between said contact and a received battery.

7. A camera comprising:
a housing having means for defining (1) a cavity for receiving at least one battery and (2) an opening through which such a battery may be inserted into said cavity, said cavity being dimensioned to permit movement of a received battery in said cavity;
means on said housing for restricting such movement of a received battery between first and second positions;
an electrical circuit;
at least one electrical contact on said housing and extending into said cavity for connecting a received battery to said circuit;
a door movable relative to said housing between open and closed positions to respectively uncover and cover said opening; and
means for moving a received battery relative to said contact to its first and second positions respectively when said door is moved to its open and closed positions so as to provide rubbing engagement between said contact and a received battery, said moving means comprising (1) resilient means in said cavity for urging said battery to its first positions and (2) abutment means on said door for moving said battery from its first position to its second position as said door is moved to its closed position.

* * * * *